Figure 1:
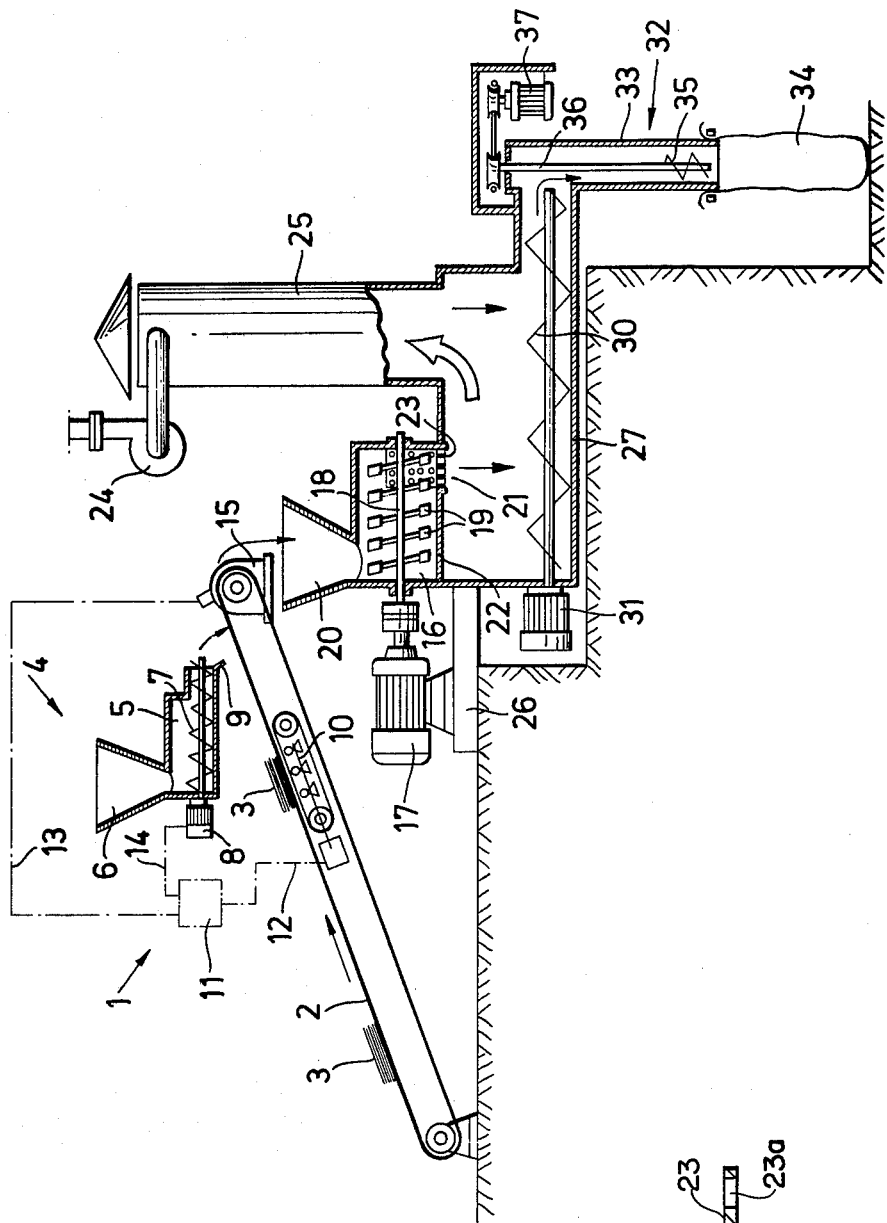

United States Patent [19]

Fruh

[11] 4,084,753

[45] Apr. 18, 1978

[54] APPARATUS FOR THE PREPARATION OF INSULATING MATERIAL

[75] Inventor: Ernst Josef Fruh, Sasbach, Baden, Germany

[73] Assignee: Iminex GmbH, Zug, Switzerland

[21] Appl. No.: 732,200

[22] Filed: Oct. 14, 1976

[30] Foreign Application Priority Data

Oct. 15, 1975 Germany .............................. 2646130

[51] Int. Cl.² ............................................. B02C 23/10
[52] U.S. Cl. ........................................ 241/34; 241/58; 241/73; 241/89.3; 241/188 R
[58] Field of Search ........................ 241/33, 34, 49, 51, 241/54, 57, 58, 73, 79.2, 89.3, 186 R, 186.1, 186.2, 188 R

[56] References Cited

U.S. PATENT DOCUMENTS

| 551,097 | 12/1895 | Russell | 241/188 R |
|---|---|---|---|
| 1,777,670 | 10/1930 | Hausman | 241/34 |
| 2,428,100 | 9/1947 | Soulen | 241/34 |
| 3,170,640 | 2/1965 | Kolts et al. | 241/73 |
| 3,807,646 | 4/1974 | Leiter et al. | 241/188 R |

*Primary Examiner*—Granville Y. Custer, Jr.

*Attorney, Agent, or Firm*—Diller, Brown, Ramik & Wight

[57] ABSTRACT

This disclosure relates to apparatus which is particularly adapted for forming an admixture of dry materials, such as a first sound deadening, heat resistant and fire insulating fibrous material, such as paper, and a second material which makes flame resistant, such as powdered boric acid, the apparatus including conveyor means for conveying the first dry material between input and discharge points along a path of travel established by the conveyor means, means for detecting the amount of the first dry material being conveyed, means responsive to the detecting means for feeding the second dry material to the conveying means in proportion to the amount of the first dry material detected by the detecting means, and comminuting means at the discharge point for receiving the first and second materials and comminuting the same into a homogeneous admixture. The detecting means are preferably weighing means, means for imparting motion to the conveyor means, and the responsive means function further for controlling the motion imparting means to vary the speed of movement of the conveyor means in proportion to the amount of the first dry material detected by the detecting means.

8 Claims, 2 Drawing Figures

U.S. Patent

April 18, 1978

4,084,753

APPARATUS FOR THE PREPARATION OF INSULATING MATERIAL

The present invention is directed to a novel apparatus and an associated process for the continuous preparation of sound, heat and fire insulating fibrous material, such as beaten paper, and powdery, flame-resistant making material, such as powdered boric acid. The fibrous material and the powdered flame-resistant making material are both in a dry condition and are comminuted and admixed into a homogeneous admixture by conventional comminuting means as, for example, a hammer mill or the like.

The eventually produced homogeneous admixture is composed of about 70 to 75% by weight of the sound, heat and fire insulating fibrous material, such as average quality newsprint and about 25 to 30% by weight of the powdery flame-resistant making material (pulverized boric acid or the like to which some aluminum sulfate may be added). Average quality newsprint forms an excellent skeleton for the eventually formed homogeneous admixture because its fibers are cellular by nature and they contain a great number of void air spaces into which the powdery, flame-resistant material is readily received. However, in lieu of paper or newsprint it is also possible to employ cellulose or cellulose fibers, in particular natural fibers, though synthetic fibers of a high chain-molecular substance may be utilized in keeping with this invention.

Since the two materials differ considerably from each other as to their specific gravity, bulk density and other properties, it is necessary in order to produce a dry homogeneous admixture thereof by a continuous process to maintain a particular ratio of the two materials and such must be held constant because the quality of the flame-resistance of the homogeneous admixture is dependent upon the homogeneity thereof. The sound, heat and fire insulating fibrous particles or individual fibers and/or fiber balls should be uniformly covered by the powdery or powdered flame-resistant material because of the homogeneity required.

It is known to comminute newsprint per se, and feed the same by means of a suction stream and an air separator to a conventional dosing mechanism for impregnating the comminuted newsprint with a desired quantity of the pulverized or powdery flame-resistant making material. Thereafter the heterogeneous mixture produced in accordance with this process is transferred to a further pulverizing plant utilizing a conventional hammer mill or the like. Needless to say, the additional pulverizing plant required involves a considerable expenditure of money and generally utilized more than a single conventional pulverizing device. Since the newsprint or similar fibrous material is comminuted before the dosing thereof or the addition thereto of the powdery flame resistant making material, the equipment utilized in such conventional processes must be specifically designed to maintain the comminuted or disintegrated paper in a loose condition during the conveying thereof between the comminuting station and the dosing station. It is for this reason that an air stream is generally utilized for the conveyance of the comminuted material, but this disadvantage thereof is the necessary provision of purifying the air by filtering or the like to preclude fibers from being recirculated to atmosphere or back into the conveyance air stream. The dosage of the powdery flame-resistant making material upon the precomminuted newsprint or similar fibrous material is complicated, handling is difficult, and the portion of the relatively more expensive powdery flame-resistant making material in the final admixed product fluctuates relatively greater so that the mixture is heterogeneous rather than homogeneous. By and large the fissures created by the fibers of the fibrous material do not contain sufficient flame-resistant making material and/or the proportion of both materials is not suitable to produce a high quality end product.

In keeping with the foregoing, it is a primary object of this invention to unite the sound, heat and fire insulating fibrous material with the powdery flame-resistant making material in the absence of any comminution of the former and to comminute the materials simultaneously to obtain a homogeneous admixture thereof. Homogeneity is additionally assured due to the utilization of an air current during the comminution which tends to additionally admix or blend the two materials. Moreover, as compared to conventional practice the fact that the non-comminuted fibrous material and the powdery fire resistant making material are comminuted together, they must necessarily reside in the comminuting machine (hammer mill) longer than might be necessary if the fibrous material were precomminuted, thereby further assuring homogeneity of the final admixed end product. As a result the apparatus and method of this invention achieves reliable impregnation or enrichment of the fibrous material by the fire-resistant making material and excellent homogeneity of both materials is assured.

The apparatus is designed specifically to achieve the advantages heretofore noted over known prior art and includes conveyor means for conveying a first dry material between input and discharge points along a path of travel, means for detecting the amount of the first dry material being conveyed by the conveying means, means responsive to the detecting means for feeding a second dry material to the conveying means in proportion to the amount of the first dry material detected by the detecting means, and comminuting means at the discharge point for receiving the first and second materials for comminuting the same into a homogeneous admixture.

In further accordance with this invention, another object is that of constructing the conveyor means as a belt conveyor and the detecting means is preferably weighing means, such as a conventional conveyor-type weigher, and only the single belt conveyor is necessary to transfer or convey the two materials to the comminuting means, thus eliminating additional conveyors as required in conventional practice. Furthermore, no measures need be taken to maintain the fibrous material in loose condition as it moves on the conveyor in conjunction with the fire resistant material because both materials are subsequently thoroughly admixed by the comminuting means.

In further accordance with this invention, a further object is that of providing means for imparting motion to the conveyor belt, and the responsive means functions further for controlling the motion imparting means to vary the speed of movement of the conveyor belt in proportion to the amount of the first dry material detected by the detecting or weighing means.

Still another object of this invention is to provide comminuting means of the type including a rotatable comminuting member in a chamber having an inlet and outlet end, the outlet end having a plurality of perforations for discharging therethrough the homogeneous mixture, and the plurality of perforations increase in size in a direction away from the inlet end of the comminuting chamber.

Still another object of this invention is the provision in the apparatus thus far described of suction means upstream of a filter which, in turn, is upstream of the outlet opening of the comminuting chamber for drawing air from the chamber through the outlet to augment the movement of the materials in a direction from the inlet end toward the outlet end of the chamber and additionally augment the admixing operation of the comminuting means.

A further object of this invention is to utilize a single detecting or weighing means for controlling both the speed of the conveyor belt and the amount of fire-resistant material which is fed to the conveyor belt prior to any precomminuting of the fibrous material.

A further object of this invention is to construct the comminuting means as a rotating hammer mill having a chamber or jacket which is closed except at inlet and outlet ends thereof so that the comminuting and/or mixing of the materials is intensified in their dry condition without premature escape thereof from the chamber with the discharge being effected through a perforated outlet of the chamber to guarantee sufficient residence time of the two materials within the chamber to achieve a homogeneous comminuted admixture thereof.

Still another object of this invention is to preferably create the air stream within the comminuting chamber by utilizing a suction blower which is preferably a vent with a nozzle suction filter in order that correct dust (fiber) and air separation is achieved and the final homogeneous admixed product can be immediately packed for subsequent use.

With the above and other objects in view that will hereinafter appear, the nature of the invention will be more clearly understood by reference to the following detailed description, the appended claimed subject matter, and the several views illustrated in the accompanying drawings.

In the Drawing:

FIG. 1 is a schematic side elevational view partially in cross-section of a novel apparatus or machine constructed in accordance with this invention and illustrates fibrous material being weighed as it is carried by a conveyor, means for detecting the weight of the fibrous material, means responsive to the detected weight for discharging powdery fire-resistant making material upon the conveyor and comminuting means for comminuting and admixing the fibrous and fire-resistant making material prior to eventual packaging.

Figure 2:
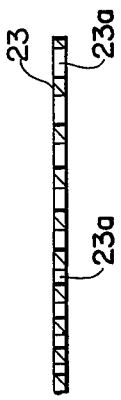

FIG. 2 is an enlarged schematic sectional view through a discharge screen of the comminuting means.

A novel machine or apparatus constructed in accordance with this invention is generally designated by the reference numeral 1 and is particularly adapted for forming an admixture of dry materials, such as first sound, heat and fire insulating fibrous material, such as paper, and second, powdery, flame-resistant making material, such as powdered boric acid which may have pre-added thereto aluminum sulfate. The machine 1 includes conveyor means 2 in the form of a conveyor belt for receiving upon an upper run (unnumbered) thereof sound, heat and fire insulating fibrous material in non-pulverized condition, such as bundles of newsprint 3. The conveyor 2 is inclined to the horizontal and conveys the material 3 between an input point (unnumbered) at the lower lefthand side of the conveyor 2 toward a discharge point (unnumbered) at the upper righthand side of the conveyor belt 2 along a generally upwardly inclined path of travel.

Means generally designated by the reference numeral 4 are provided for feeding a second dry, powdery, flame-resistant making material, such as powdered boric acid which may contain aluminum sulfate to the upper run of the conveyor belt 2. The means 4 includes a chamber or container 5 fed through a hopper 6 with the container 5 having a worm feed or screw 7 driven by an electric motor 8. A discharge chute 9 dispenses the second fire-resistant material upon the upper run of the conveyor belt 2.

Means 10 are associated with the conveyor 2 for detecting the amount of the first dry material 3 being conveyed by the conveyor 2. The detecting means 10 is a conventional conveyor type weighing device which weighs the fibrous material 3 at a point between the input and discharge points of the conveyor 2 during the movement of the upper run of the conveyor and, of course, prior to any comminution of the material 3. As will be described hereinafter, the purpose of the detecting or weighing means 10 is to regulate the speed of the conveyor 2 and the feed of the second powdery fire-resistant making material by the rotation of the feed screw 7. To this effect, conventional electrical responsive means 11 of usual construction is coupled by suitable wiring or electrical lines 12 to the weighing means 10 and includes further lines, leads or conductors 13, 14 connected respectively to a drive motor 15 for imparting motion to the conveyor belt 2 and the drive motor 8 of the feed screw 7. The electrical responsive means 11 includes appropriate logic circuitry to vary the speed of either one or both of the drive motors 8, 15 depending, of course, upon the particular weight of the material 3 determined by the weighing means 10 or prevent the actuation of the motor 8 in the absence of material 3 on the conveyor. In this manner, the variation in the speed of the conveyor 2 and the variation in the speed of the feed screw 7 assures that a desired admixture of the material 3 and the flame-resistant material (not shown or numbered) fed to the conveyor 2 by the feed screw 7 is assured prior to the combined comminuting and admixing thereof in a manner to be described hereinafter.

Comminuting means 16 at the discharge point (unnumbered) of the conveyor 2 receive the first and second materials conveyed by the conveyor belt 2 and comminute the same into a homogeneous admixture. The comminuting means 16 may be a conventional hammer mill which includes a shaft 18 carrying a number of comminuting members or plates 19 having thickened ends functioning as hammers to comminute and admix the first and second materials supplied thereto. The shaft 18 is housed within a chamber (unnumbered) of the comminuting means 16 defined by a jacket 22, and rotation is imparted to the shaft 18 through a variable speed electric motor 17 suitably supported upon a base frame 26 of the machine 1. The first and second materials are fed into the chamber defined by the jacket 22 through an inlet hopper 20 and when comminuted and admixed are delivered from the chamber through an outlet 21 remote from the inlet hopper 20. Except for the inlet hopper 20 and the outlet 21 the jacket 22 is otherwise devoid of apertures, and at the outlet 21 is positioned a screen 23 having a plurality of holes or perforations 23a which gradually increase in size from left-to-right as viewed in FIG. 1 of the drawing or in the direction of travel of the two materials as they are advanced from the inlet hopper 20 toward the outlet 21 of the jacket 22, as is best shown in FIG. 2. The perforations of the screen 23 increase in size to a maximum of approximately 3 to 4 millimeters at the righthand most end of the jacket 22. Due to this gradual increase in the size of the perforations, only the fines initially pass through the screen and it is assured that sufficient residence time of the two materials within the jacket 22 is achieved to obtain thorough comminuting and admixture thereof to produce a final homogeneous admixed product.

The movement of the two materials by the comminuting members 19 is also augmented by an air stream flowing from the area of the inlet hopper 20 toward the outlet 21 by virtue of a suction pump or blower 24. Preferably a filter assembly 25 is disposed between the suction pump 24 and the filter 23 and the filter assembly 25 is preferably of the conventional nozzle suction type wherein there is a conventional filter cloth and above the cloth are cells or nozzles connected to the suction pump 24. Air passes through the filter cloth while the powdery material is retained by the filter cloth and drops into a collecting chamber 27.

The collecting chamber 27 is situated below the base frame 26 and collects the homogeneous admixture which drops by gravity from the outlet 21. The admixed homogeneous material collected in the chamber 27 is discharged therefrom by a feed screw 30 driven by an electric motor 31. The final homogeneous admixed material is deposited into a sack or container 34 located between sacking means 32 which includes a filling tube 33 having telescopically received therein a feed screw 35 carried by a shaft 36 which is rotated by an electric motor 37 and suitable pulley and belt drive means (unnumbered).

Essentially the apparatus thus far described constitutes a relatively compact arrangement whereby non-comminuted or non-pulverized bulk fibrous material 3 is first combined with fire-resistant making material upon the conveyor 2 prior to the simultaneous comminution and admixture of both by the comminuting means 16. Though the latter is disclosed as having an axis of rotation which is horizontal, the same may be inclined to the horizontal up to an angle of 90° thereto. However, irrespective of the particular disposition of the comminuting means 16 the control afforded by the weighing means 10 and the means 11 responsive thereto assures that a proper proportion of the material 3 and the fire-resistant material is united upon the conveyor 2 prior to the comminution thereof. Moreover, due to the perforated screen 23 of the outlet 21 of the comminuting means 16, the residence time of the two materials within the jacket 22 is maintained sufficiently to assure thorough comminution of the earlier non-comminuted or non-pulverized material 3 and the powdered fire-resistant making material to assure thorough comminution and homogeneity between the two prior to discharge thereof as a homogeneous admixture through the outlet 21.

While preferred forms and arrangement of parts have been shown in illustrating the invention, it is to be clearly understood that various changes in details and arrangements of parts may be made without departing from the scope and spirit of this disclosure.

I claim:

1. Apparatus particularly adapted for forming an admixture of dry materials comprising conveyor means for conveying a first dry material between input and discharge points along a path of travel established by said conveyor means, means for detecting the amount of the first dry material being conveyed by said conveying means, means responsive to said detecting means for feeding a second dry material to said conveying means in proportion to the amount of the first dry material detected by said detecting means, and comminuting means at said discharge point for receiving said first and second material for comminuting the same into homogeneous admixture, said comminuting means including a chamber, a rotatable comminating member in said chamber for comminuting the first and second materials and moving the same between inlet and outlet ends of said chamber, an outlet opening in said outlet end for discharging therethrough the homogeneous admixture, a filter downstream of said outlet opening, and suction means downstream of said filter for drawing air from said chamber through said outlet, to augment the movement of the first and second materials from said inlet end toward said outlet end.

2. The apparatus as defined in claim 1 wherein said detecting means includes means for weighing the first dry material as it is conveyed by said conveyor means along said path of travel between said input and discharge points.

3. The apparatus as defined in claim 1 including means for imparting motion to said conveyor means to move said first dry material along said path of travel between said input and discharge points, and said responsive means function further for controlling said motion imparting means to vary the speed of movement of said conveyor means in proportion to the amount of the first dry material detected by said detecting means.

4. The apparatus as defined in claim 1 wherein said detecting means includes means for weighing the first dry material as it is conveyed by said conveyor means along said path of travel between said input and discharge points.

5. The apparatus of claim 1 wherein said chamber outlet end has a plurality of perforations for discharging therethrough said homogeneous mixture.

6. The apparatus of claim 5 wherein said perforations increase in size axially of said chamber away from said inlet end.

7. Apparatus particularly adapted for forming an admixture of dry materials comprising conveyor means for conveying a first dry material between input and discharge points along a path of travel established by said conveyor means, means for detecting the amount of the first dry material being conveyed by said conveying means, means responsive to said detecting means for feeding a second dry material to said conveying means in proportion to the amount of the first dry material detected by said detecting means, comminuting means at said discharge point for receiving said first and second material for comminuting the same into homogeneous admixture, said comminuting means includes a chamber, a rotatable comminuting member in said chamber for comminuting the first and second materials and moving the same between inlet and outlet ends of said chamber, said outlet end having a plurality of perforations for discharging therethrough the homogeneous admixture, and suction means downstream of said perforations for augmenting the flow of the homogeneous admixture beyond said outlet end.

8. The apparatus of claim 7 wherein said perforations increase in size axially of said chamber away from said inlet end.

* * * * *

UNITED STATES PATENT OFFICE
CERTIFICATE OF CORRECTION

PATENT NO. : 4,084,753
DATED : April 18, 1978
INVENTOR(S) : Ernst Josef Fruh

It is certified that error appears in the above-identified patent and that said Letters Patent are hereby corrected as shown below:

Page 1, column 1, under item (30) Foreign Application Priority Date, after "Germany........." change "2646130" to --2546130--.

Signed and Sealed this

Thirty-first Day of October 1978

[SEAL]

Attest:

RUTH C. MASON
Attesting Officer

DONALD W. BANNER
Commissioner of Patents and Trademarks